(12) United States Patent
Lev et al.

(10) Patent No.: US 7,463,481 B2
(45) Date of Patent: Dec. 9, 2008

(54) COMPUTER WITH HINGE POST AND HINGE MOUNT AND RELATED METHODS

(75) Inventors: Jeffrey A. Lev, Houston, TX (US); Paul J. Doczy, Houston, TX (US); Earl W. Moore, Houston, TX (US); Pablo J. Salazar, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 341 days.

(21) Appl. No.: 11/364,256

(22) Filed: Feb. 28, 2006

(65) Prior Publication Data

US 2006/0203440 A1 Sep. 14, 2006

Related U.S. Application Data

(60) Provisional application No. 60/660,011, filed on Mar. 9, 2005.

(51) Int. Cl.
*G06F 1/16* (2006.01)
(52) U.S. Cl. .................. 361/681; 361/683; 248/921; 248/923
(58) Field of Classification Search ......... 361/679–686, 361/724–727; 248/917–924; 455/575.1, 455/575.3, 575.4; 345/156, 905, 157, 168, 345/169; 16/365, 366, 367; 439/165
See application file for complete search history.

(56) References Cited

U.S. PATENT DOCUMENTS

| 5,200,913 | A | 4/1993 | Hawkins et al. |
| 5,333,116 | A | 7/1994 | Hawkins et al. |
| 5,566,048 | A * | 10/1996 | Esterberg et al. ............ 361/681 |
| 5,608,608 | A | 3/1997 | Flint et al. |
| 5,949,642 | A | 9/1999 | Park |
| 6,072,465 | A | 6/2000 | Maeda et al. |
| 6,081,207 | A | 6/2000 | Batio |
| 6,219,681 | B1 | 4/2001 | Hawkins et al. |
| 6,275,376 | B1 | 8/2001 | Moon |
| D448,764 | S | 10/2001 | Marsalka et al. |
| 6,421,235 | B2 | 7/2002 | Ditzik |
| 6,694,570 | B2 * | 2/2004 | Chen .......................... 16/367 |
| 6,751,090 | B1 * | 6/2004 | Yang .......................... 361/681 |
| 6,839,576 | B2 | 1/2005 | Aagaard et al. |
| 6,845,005 | B2 | 1/2005 | Shimano et al. |
| 6,856,506 | B2 | 2/2005 | Doherty et al. |
| 2001/0001859 | A1 | 5/2001 | Hawkins et al. |
| 2003/0112590 | A1 | 6/2003 | Shimano et al. |
| 2004/0264126 | A1 | 12/2004 | Wells |
| 2005/0038982 | A1 | 2/2005 | Park et al. |

* cited by examiner

*Primary Examiner*—Jayprakash N Gandhi
*Assistant Examiner*—Nidhi Desai (57) ABSTRACT

A computer base unit is disclosed, among other apparatus and methods. One embodiment of a computer base unit has a panel, the panel comprising a hinge post and a hinge mount, the hinge post configured to couple to a shaft-in-shaft hinge and the hinge mount configured to couple to a swivel hinge assembly.

16 Claims, 12 Drawing Sheets

COMPUTER WITH HINGE POST AND HINGE MOUNT AND RELATED METHODS

CROSS-REFERENCE TO RELATED APPLICATION

This application claims priority to copending U.S. provisional application entitled, "COMPUTER WITH HINGE POST AND HINGE MOUNT AND RELATED METHODS," having Ser. No. 60/660,011, filed Mar. 9, 2005, which is entirely incorporated herein by reference.

BACKGROUND

Portable computing devices, such as palm-top computers, hand-held computers, notebook computers, personal computer tablets, and personal digital assistants (PDAs), have become increasingly popular. Portable computing devices generally use a base unit and a display assembly that is configured for the particular base display.

Meeting consumer demand for these various devices while maintaining low inventories and manufacturing costs is a challenge for manufacturers and retailers alike. One solution is to offer functionality of more than one portable computing device in a single assembly. For instance, some portable computing devices existing in the market today have display assemblies that can be configured with notebook and tablet PC functionality. Additionally, some portable computing devices are available that are configured with dual functionality base units in combination with multi-function displays. However, if consumers insist on separate portable computing devices (e.g., a unit dedicated to simply notebook functionality) because of cost, familiarity, or other reasons, these multi-function products result in increased inventory or tooling costs.

BRIEF DESCRIPTION OF THE DRAWINGS

The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed herein are various embodiments of configure-to-order (CTO) computer products and methods. An embodiment of a base unit is disclosed that comprises at least one hinge post and at least one swivel hinge assembly mount that enables various hinges (and thus various display assemblies) to be attached to the base unit depending on the desired functionality. The various display assemblies may comprise a notebook display assembly (e.g., clamshell style) and a tablet personal computer (PC) display assembly (e.g., center swivel). In one embodiment, one set of hinges that may be coupled to the at least one base unit hinge post comprises shaft-in-shaft style hinges (also known as friction hinges, mailbox hinges, notebook hinges, etc.) for coupling to and assisting in the support of a notebook display assembly. The notebook display assembly can be opened and closed with respect to the base unit in a clamshell manner. Another hinge type attached to the at least one base unit hinge mount comprises a swivel hinge assembly, also known as a tablet hinge assembly, for coupling to and assisting in the support of a tablet PC display assembly. The swivel hinge assembly may further comprise one or more shaft-in-shaft hinges that enable the display panel to open and close with respect to the base unit.

Figure 1:
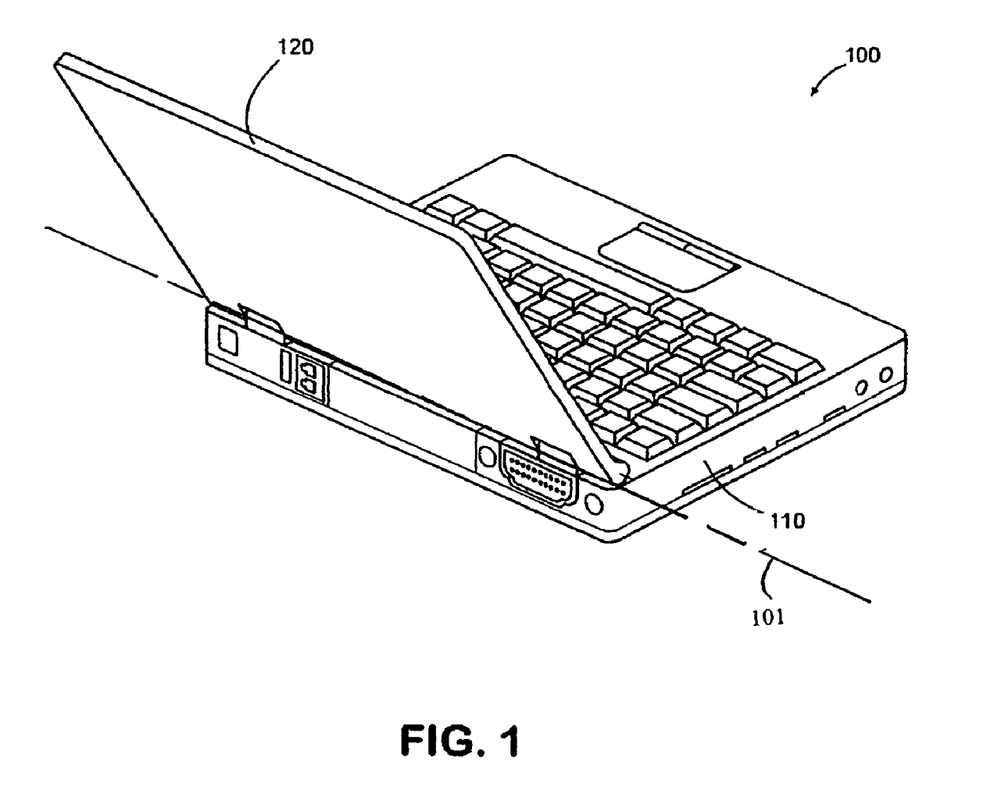
FIG. 1 is a schematic diagram that illustrates an embodiment of a configure-to-order (CTO) computer comprising a base unit coupled to a notebook display assembly.

FIG. 1 is a schematic diagram that illustrates a configure-to-order (CTO) computer 100 comprising a base unit 110 coupled to a notebook display assembly 120. The base unit 110 comprises one or more hinge posts configured for use with shaft-in-shaft hinges. The base unit 120 is also constructed with one or more hinge mounts configured for use with a swivel hinge assembly. Thus, the base unit 110 is constructed to enable alternative coupling to the notebook display assembly 120 and to a tablet PC display assembly. In one embodiment, the base unit 110 comprises a keyboard, touchpad, one or more processors, memory, communication components, and a plurality of connectors. In one embodiment, functionality corresponding to a notebook PC may be loaded during configuration of the base unit 110.

When coupled to the notebook display assembly 120, shaft-in-shaft hinges are coupled to the hinge posts of the base unit 110 to enable opening and closing of the notebook display assembly 120 in a clamshell fashion. That is, in one embodiment, the notebook display assembly 120 is rotatable about an axis, such as axis 101 parallel to a plane of the base unit 110. The notebook display assembly 120 can be a liquid crystal display (LCD), among others.

Figure 2:
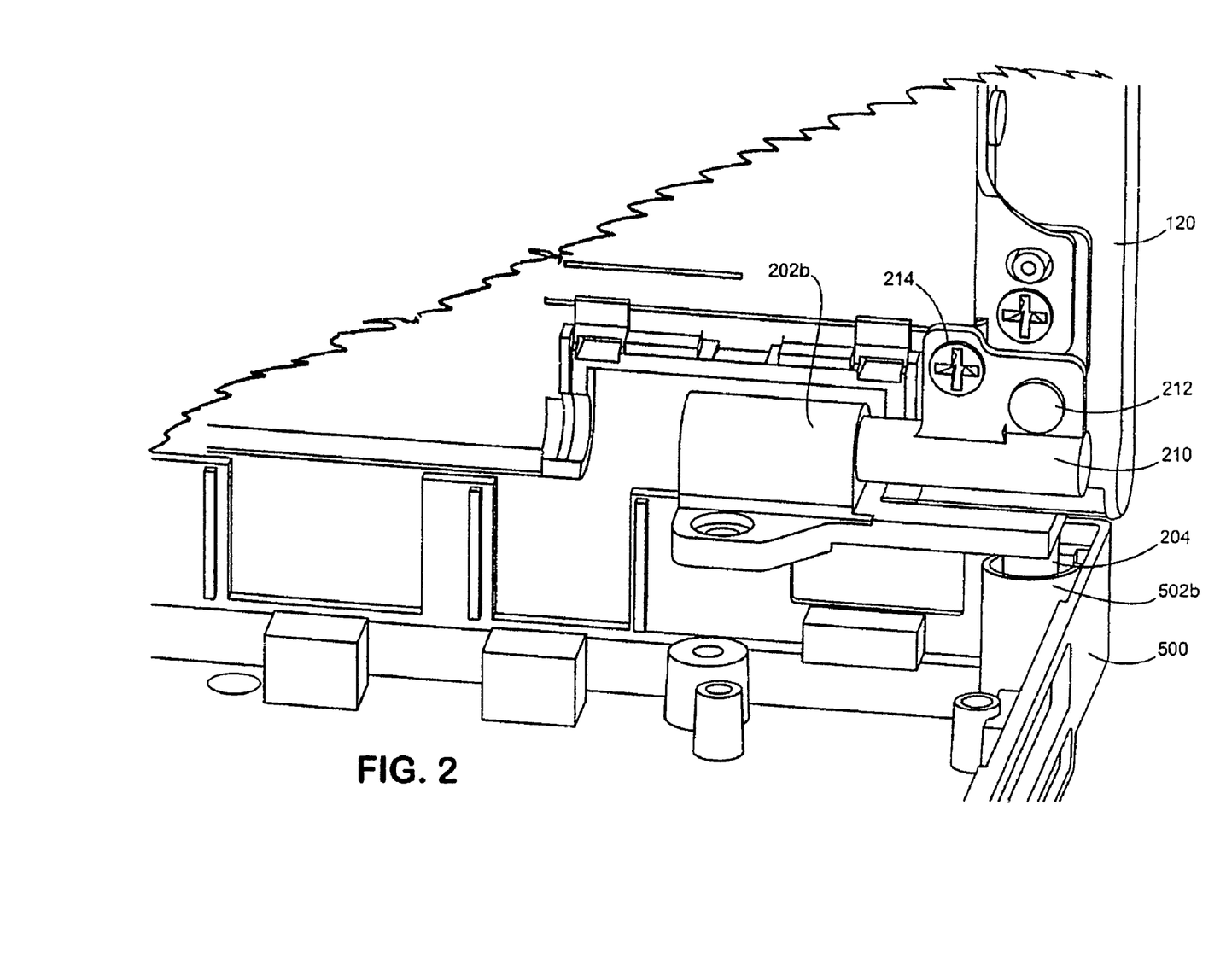
FIG. 2 is a schematic diagram that illustrates an exemplary shaft-in-shaft hinge that couples the base unit to the notebook display assembly shown in FIG. 1.

FIG. 2 is a schematic diagram that illustrates an exemplary shaft-in-shaft hinge 202b that couples the base unit 110 (FIG. 1) to the notebook display assembly 120. A bottom panel 500 of the base unit 110 is shown, comprising a hinge post 502b. Also shown are the display assembly 120 and a shaft-in-shaft hinge 202b. A portion 204 of the shaft-in-shaft hinge 202b is placed in the hinge post 502b, and secured there by one of several mechanisms (e.g., screw, glue, etc.). A shaft 210 is secured to the display assembly by fasteners 212 and 214, although other mechanisms may be used, and is placed in the shaft-in-shaft hinge 202b in a manner that enables rotation of the display assembly (e.g., in some embodiments up to 180°) about an axis parallel to plane of the base unit 110.

Figure 3:
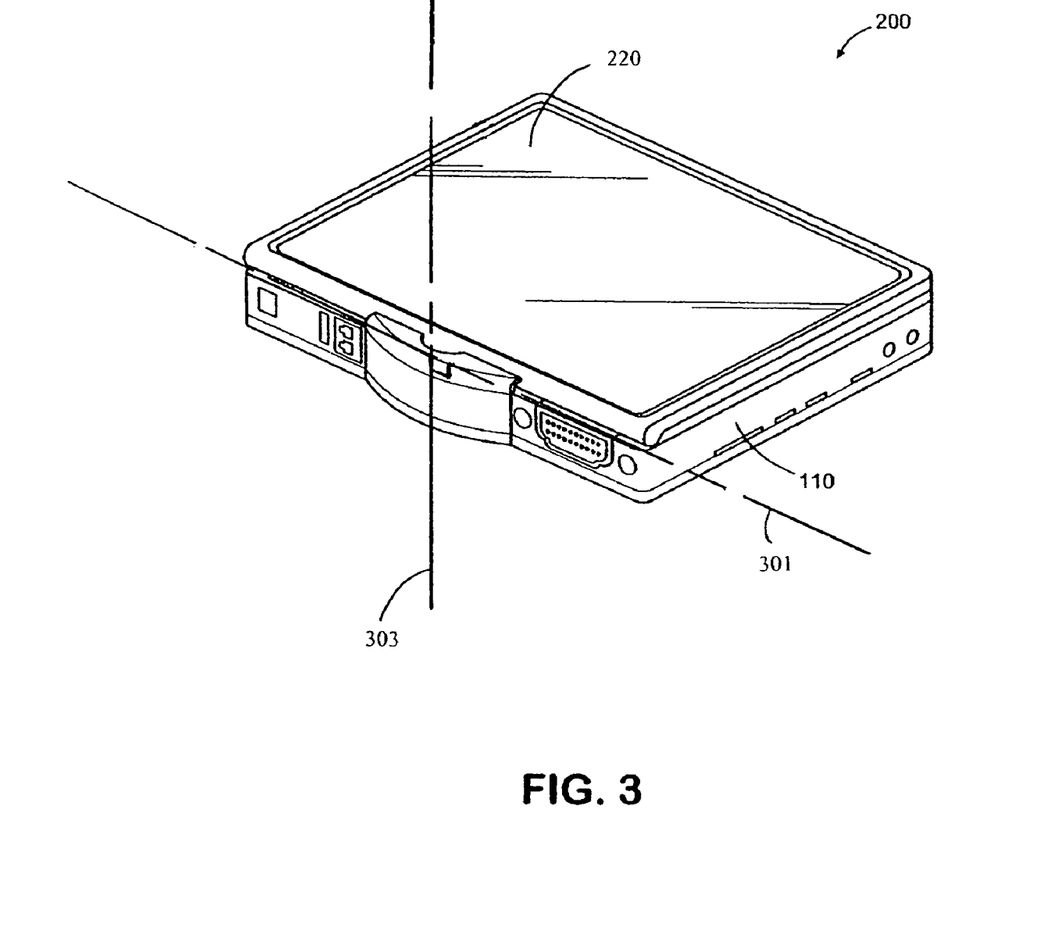
FIG. 3 is a schematic diagram that illustrates an embodiment of a configure-to-order (CTO) computer comprising a base unit coupled to a tablet personal computer (PC) display assembly.

FIG. 3 is a schematic diagram that illustrates a configure-to-order (CTO) computer 200 comprising a base unit 110 coupled to a tablet personal computer (PC) display assembly 220. The base unit 110 comprises features as described in association with FIG. 1. In one embodiment, functionality corresponding to a tablet PC may be loaded during configuration of the base unit 110. The tablet PC display assembly 220 can be an LCD, among displays of other technologies, and, in one embodiment, comprises a digitizer installed at a front or back end of the LCD to detect a coordinate value corresponding to a position on the LCD touched with an electronic pen. When a user operates the CTO computer 200 as a tablet PC computer, he or she typically touches various menus displayed through the LCD using the electronic pen (although a keyboard may also be used).

When coupled to the tablet PC display assembly 220, the base unit 110 uses a swivel hinge assembly mounted to one or more hinge mounts to couple to and assist in the support of the tablet PC display assembly 220. The swivel hinge assembly enables the tablet PC display assembly to rotate, in one embodiment, about an axis, such as axis 303, perpendicular to a plane of the base unit 110. In addition, the swivel hinge assembly comprises shaft-in-shaft hinges that enable the tablet PC display assembly 220 to be rotatable about an axis, such as axis 301, parallel to a plane of the base unit 110. Thus, in one embodiment, the tablet PC display assembly 220 can be opened, rotated, then closed such that the LCD can face upwards as shown in FIG. 3.

Figure 4:
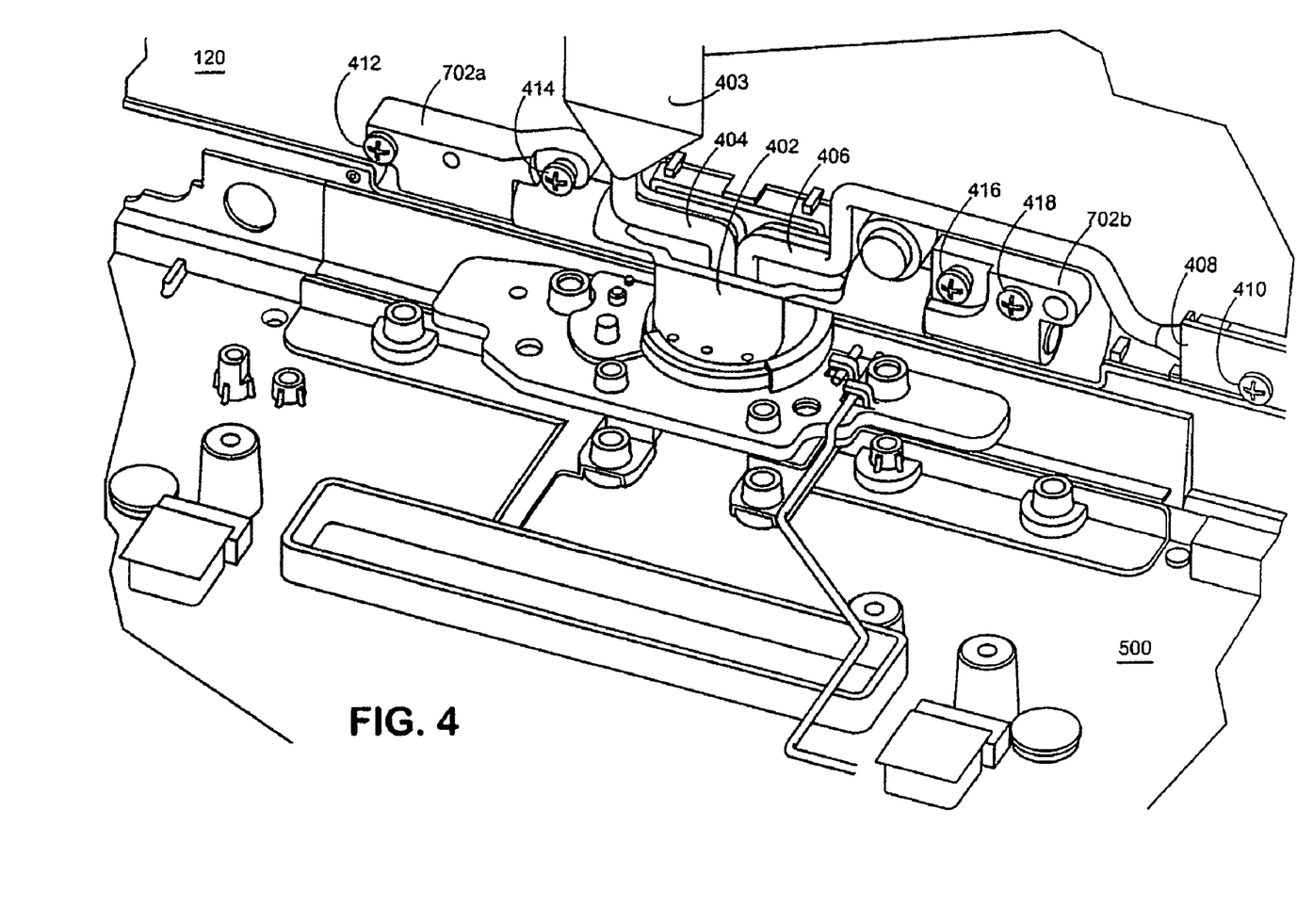
FIG. 4 is a schematic diagram that illustrates an exemplary swivel hinge assembly that couples the base unit to the tablet PC display assembly shown in FIG. 3.

FIG. 4 is a schematic diagram that illustrates an exemplary swivel hinge assembly 402 that couples the base unit 110 and tablet PC display assembly shown in FIG. 3. In one embodiment, the swivel hinge assembly 402 is secured (e.g., using screws or other securing mechanisms) to the panel 500 in four locations, although fewer or more locations may be used. For swivel rotation, the swivel hinge assembly 402 couples to the display assembly 120 at the shaft-in-shaft hinges 702a and 702b, enabling the display assembly 120 to follow the rotation of the swivel assembly 402. Shown also are connector cables 403, 404, and 406, the latter which connects at terminal 408. Terminal 408 is secured to the display assembly 120 by secure element 410 although it will be appreciated that other securing mechanisms may be used.

Notebook-type rotation occurs at the shaft-in-shaft hinges 702a and 702b of the swivel assembly 402. The shaft-in-shaft hinges 702a and 702b, in one embodiment, are secured to the display assembly 120 using screws 412, 414, 416, and 418; as before, it will be appreciated that other securing mechanisms may be used.

Figure 5:
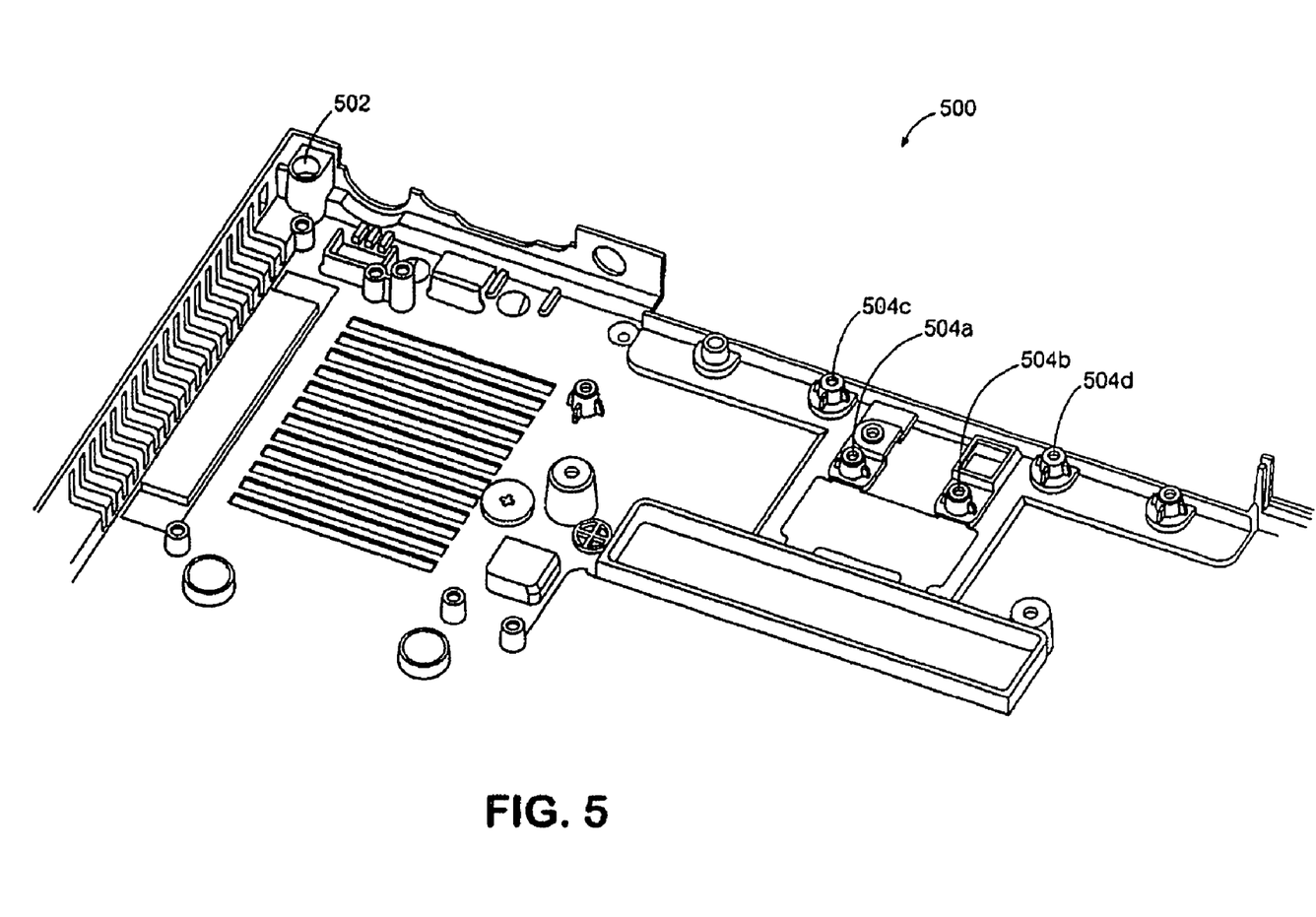
FIG. 5 is a schematic diagram that illustrates an interior, rear portion of an embodiment of a bottom panel of a base unit.

FIG. 5 is a schematic diagram that illustrates the interior, rear portion of an embodiment of the bottom panel 500 of a base unit 110. The bottom panel 500 is configured with one or more hinge posts on each rear corner of the bottom panel 500. In some embodiments, the hinge posts are formed in other locations. One hinge post 502 is shown and described, with the understanding that similar description applies to other hinge posts. The hinge post 502 is formed as part of the die cast of the bottom panel 500, although not necessarily limited to formation by a die casting operation (e.g., plastic may be used as well). Die casting may form the hinge post 502 in the form of a stub in the panel 500 that is milled to create a cavity in the hinge post 502, or in some embodiments, the hinge post 502 may be formed with a cavity as part of die casting operation. Other mechanisms may be employed to form the hinge post 502 onto the panel 500.

In the illustrated embodiment, the bottom panel 500 also comprises hinge mounts 504a, 504b, 504c, and 504d for mounting the swivel hinge assembly 402 (FIG. 4), the mounts approximately centered on the bottom panel 500, located toward the back of the panel 500, and disposed approximately midway between opposing side hinge posts (e.g., 502). Other swivel-hinge locations are possible. Also, the number of (four) hinge mounts 504a-504d are shown by way of illustration and not limitation. The mounts 504a-504d are also formed as part of the die casting of the bottom panel 500; it will be appreciated that such manufacturing is not limited to formation by die cast operation. When coupling the swivel hinge assembly 402 with the hinge mounts 504a-504d, additional hardware may be used, such as threaded and unthreaded parts to help sandwich the assemblies together. Further, the swivel hinge assembly 402 may be secured to the panel 500 by means of screws that are disposed through the bottom of the panel 500 and through the hinge mounts 504a-504d. The cavities of the hinge mounts 504a-504d may or may not be threaded.

Figure 6A:
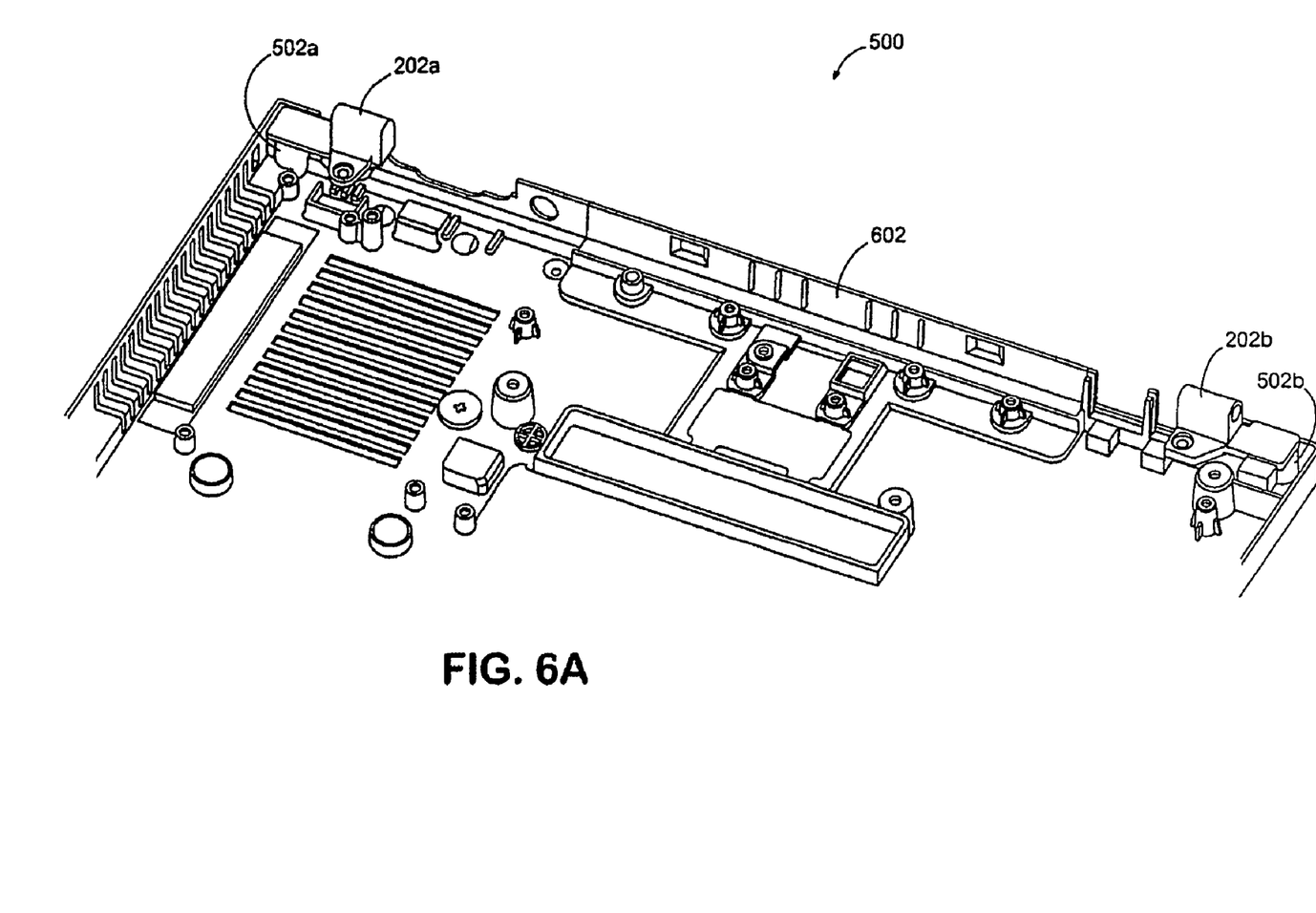
FIGS. 6A-6C are schematic diagrams that illustrate shaft-in-shaft hinges and additional features of a bottom panel of a base unit.
Figure 6B:
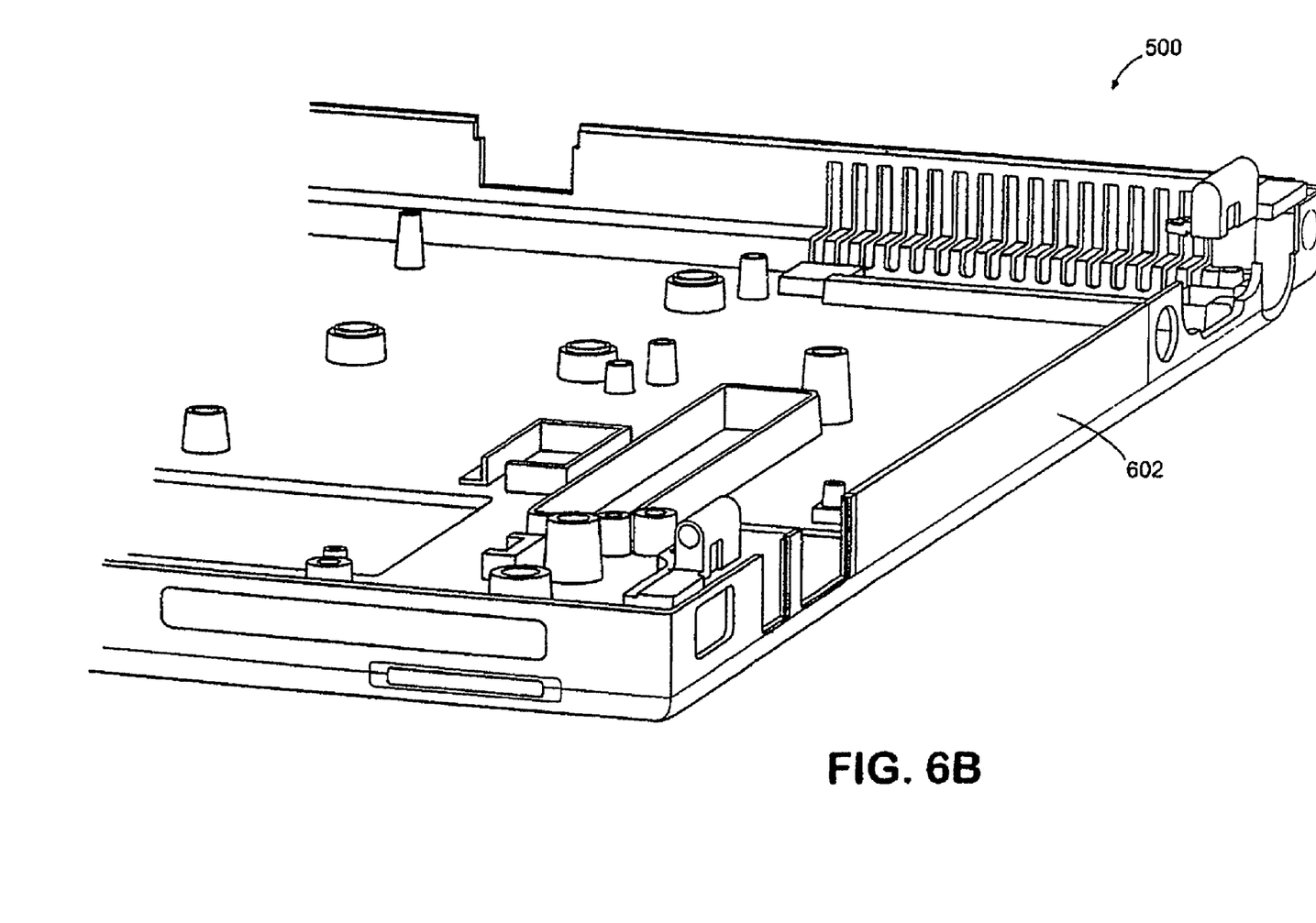

FIGS. 6A-6B are schematic diagrams that further illustrate the shaft-in-shaft hinges 202a and 202b (FIG. 2) as connected to the hinge posts 502a and 502b, respectively, of the bottom panel 500. The shaft-in-shaft hinges 202a and 202b may be constructed of one or a combination of many different types of materials, and in one embodiment, zinc is used. Further, the hinge posts 502a, 502b and the base panel 500 likewise may be constructed of one or a combination of many different types of materials, such as magnesium or plastic.

FIG. 6A shows the interior of a bottom panel 500 of the base unit 110 (FIG. 1). The bottom panel 500 comprises hinge posts 502a and 502b. The shaft-in-shaft hinges 202a and 202b are mounted to hinge posts 502a and 502b, respectively. The shaft-in-shaft hinges 202a and 202b may be mounted through any of several means, including by press fit, screw-type mounting that is integral or external to the shaft-in-shaft hinges 202a and 202b, glue, among other techniques.

Figure 6C:
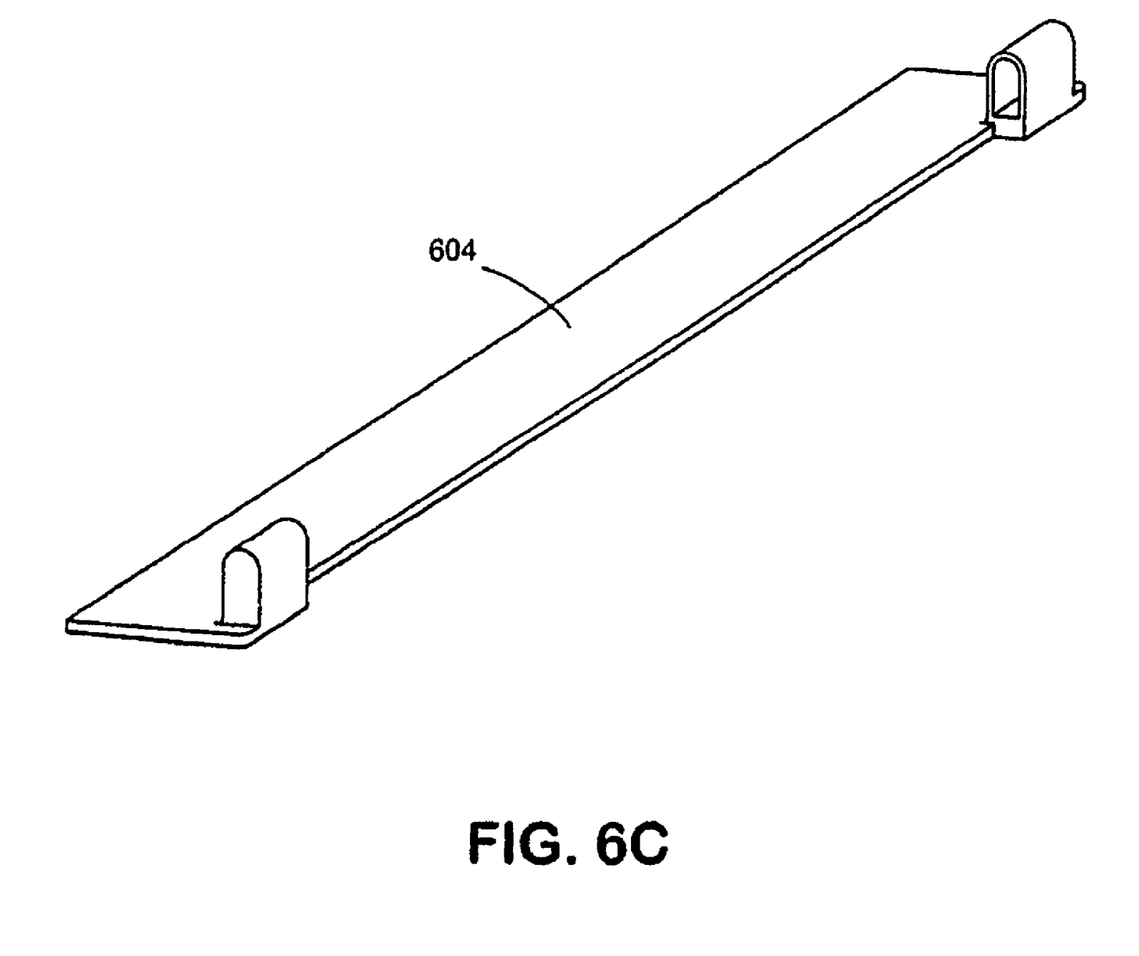

The bottom panel 500 also comprises a removable rear cover piece 602, as shown in another view in FIG. 6B. During assembly of CTO computer, the rear cover piece 602 is installed at the back of the panel 500 for notebook display functionality, providing a relatively flat back along the entire back surface of the bottom panel 500. Additionally, a cosmetic cover (also known as a bezel) 604 (FIG. 6C) is provided to cover the gap between the back of the panel 500 and the keyboard of the base unit 110 (FIG. 1), as well as to cover the hinges (202a, 202b, FIG. 2).

Figure 7A:
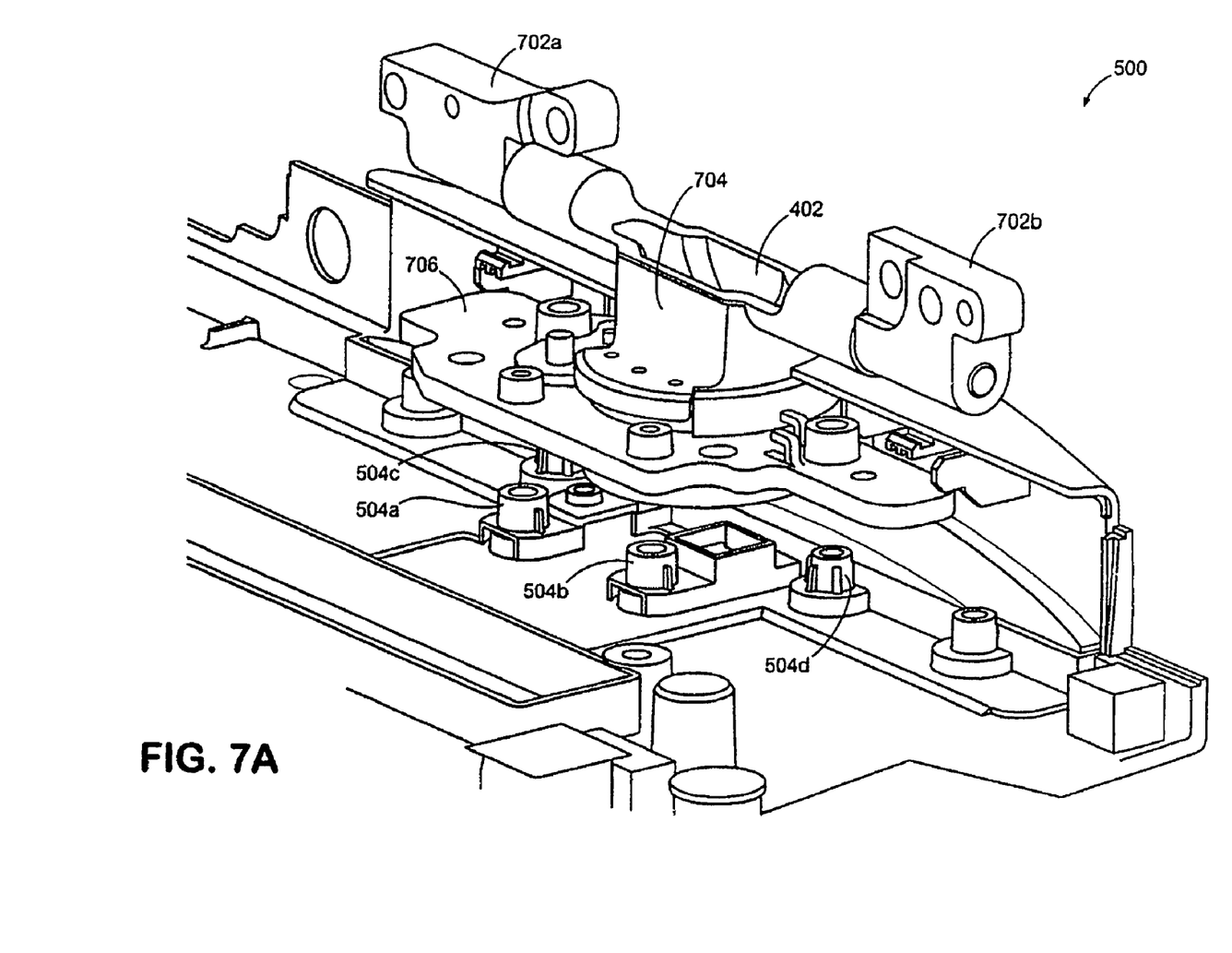
FIGS. 7A-7C are schematic diagrams that illustrate a swivel hinge assembly and additional features of a bottom panel of a base unit.
Figure 7B:
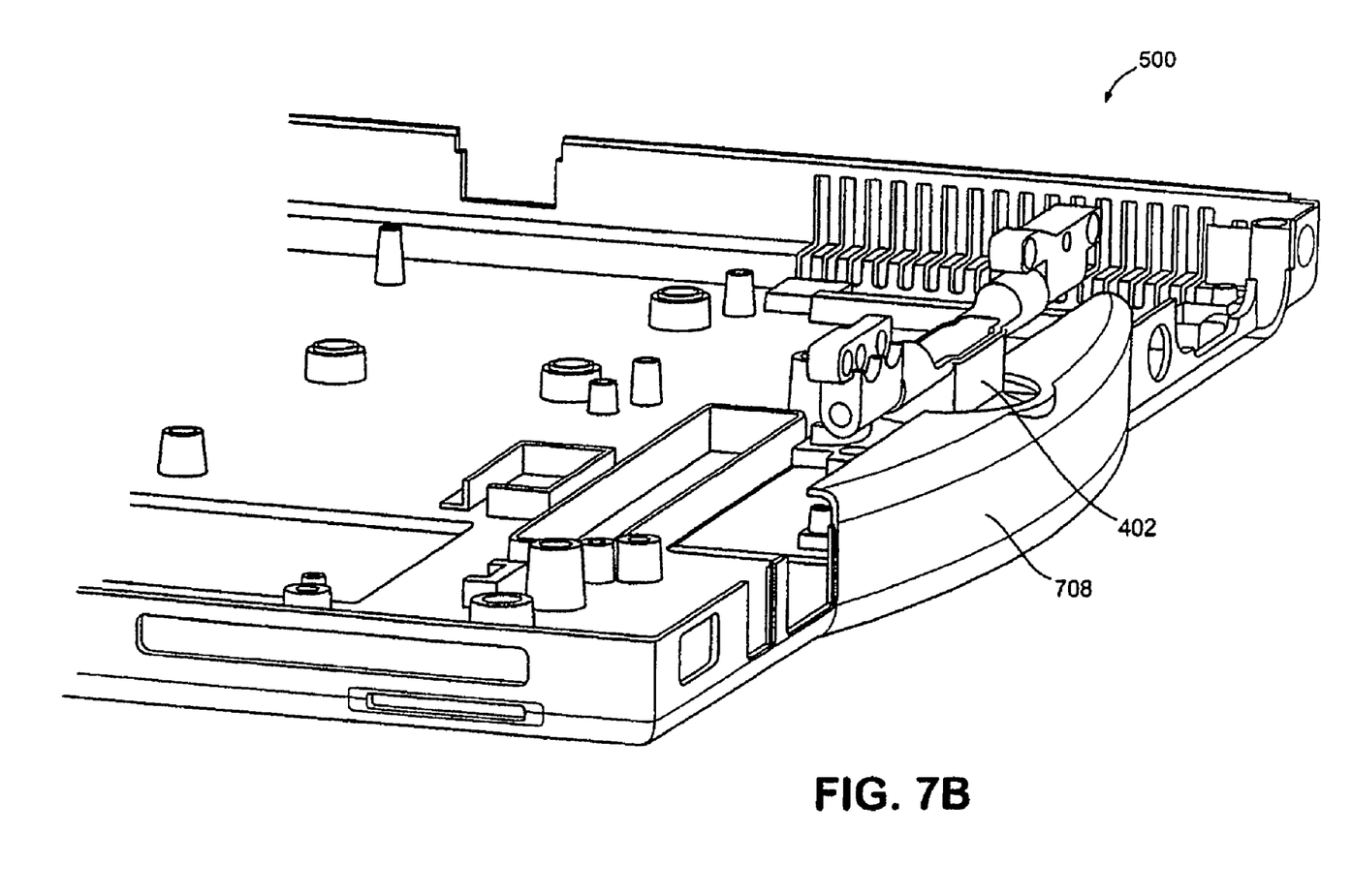

FIGS. 7A-7B are schematic diagrams that further illustrate the swivel hinge assembly 402 (FIG. 4) as mounted to the bottom panel 500. The swivel hinge assembly 402 may be constructed of one or a combination of many different materials, such as aluminum or zinc. FIG. 7A shows the interior of a bottom panel 500 of the base unit 110 (FIG. 1). The bottom panel 500 comprises hinge mounts 504a-504d to which the swivel hinge assembly 402 is attached. The swivel hinge assembly 402 comprises one or more shaft-in-shaft hinges 702a and 702b mounted to a center member 704. The center member 704 is rotatably mounted to a base member 706. The base member 706 is coupled to the hinge mounts 504a-504d, such as through the use of screws, glue, rivets, welding, etc.

Figure 7C:
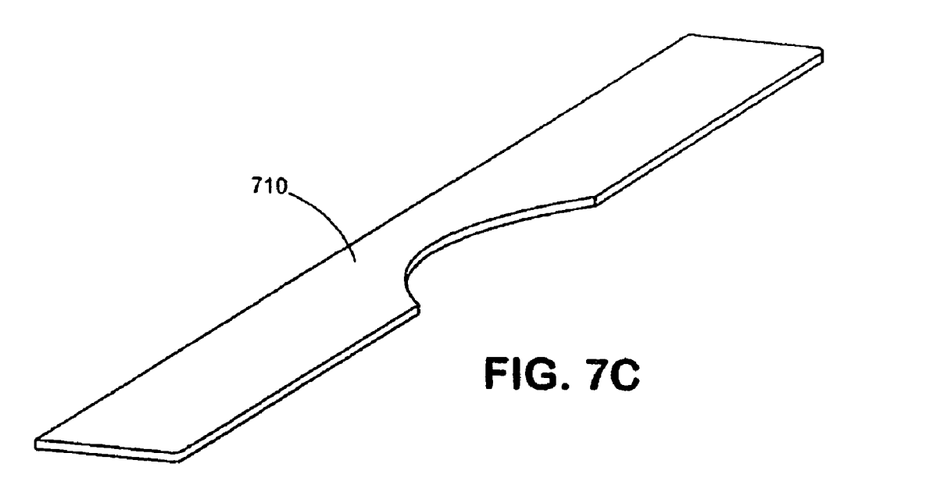

FIG. 7B provides another view of the swivel hinge assembly 402 and, in particular, the back of the panel 500. As shown, the panel 500 further comprises a rear cover piece 708 that is installed during the CTO process corresponding to tablet PC functionality. The rear cover piece 708 is configured to cover a portion of the swivel hinge assembly 402. The cover piece 708 is curvilinear in geometry, creating a bowed-out effect to a portion of the back of the bottom panel 500 (and the base unit 110 (FIG. 1) in general). Other geometric configurations for the cover piece 708 are possible. An additional cosmetic cover 710, shown in FIG. 7C, is also inserted during the CTO process to cover the gap remaining between the rear cover piece 708 and the top portion of the base unit 110.

Figure 8:
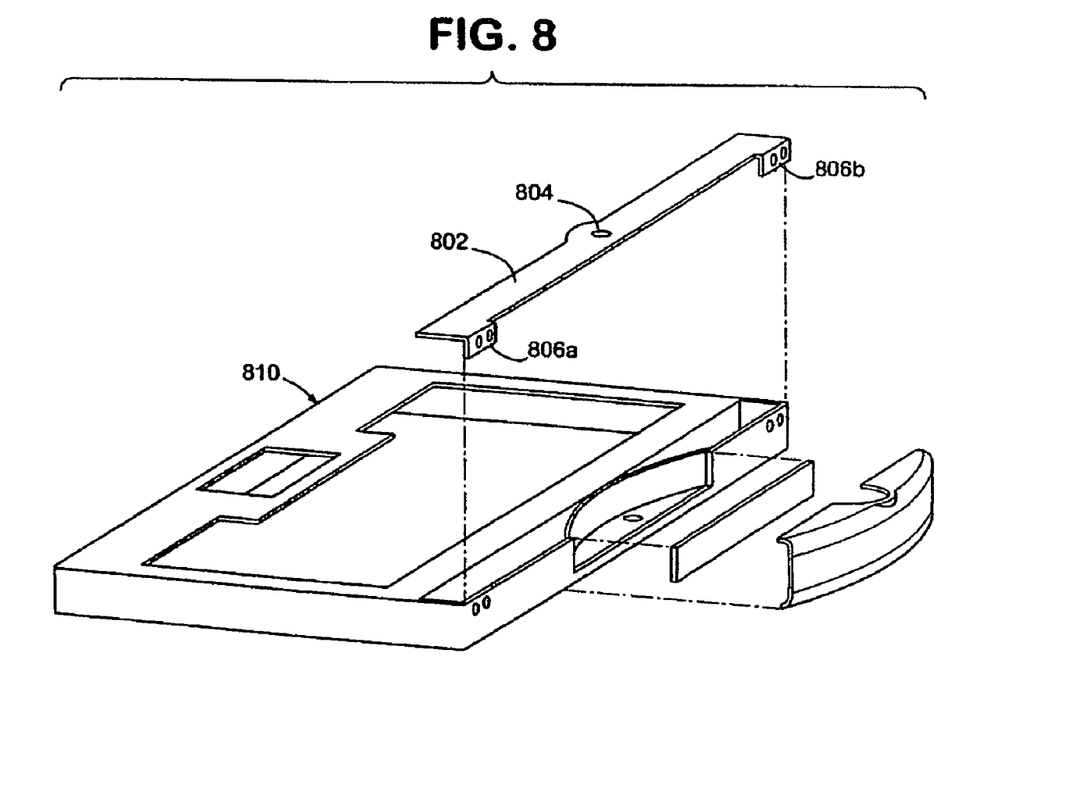
FIG. 8 is a schematic diagram that illustrates an embodiment of a base unit that further comprises a bracket.

FIG. 8 is a schematic diagram that illustrates an embodiment of a base unit 810 that further comprises a bracket 802. The bracket is optional, and is generally used in base units that do not have the structure to adequately distribute the load corresponding to the support or assisted support of notebook and tablet PC display assemblies. For example, magnesium-based base units generally do not need a bracket 802, although a bracket 802 may still be used. The bracket 802 comprises a tablet clutch mount area 804 and notebook clutch mount areas 806a and 806b. In one embodiment, the bracket 802 is comprised of a structural metal, such as magnesium, aluminum, stainless, steel, or similar strength metal or non-metal material. The bracket 802 is configured with the tablet clutch mount area 804 and notebook clutch mount areas 806a and 806b to enable the various hinges to mount directly to the various display assemblies.

Figure 9:
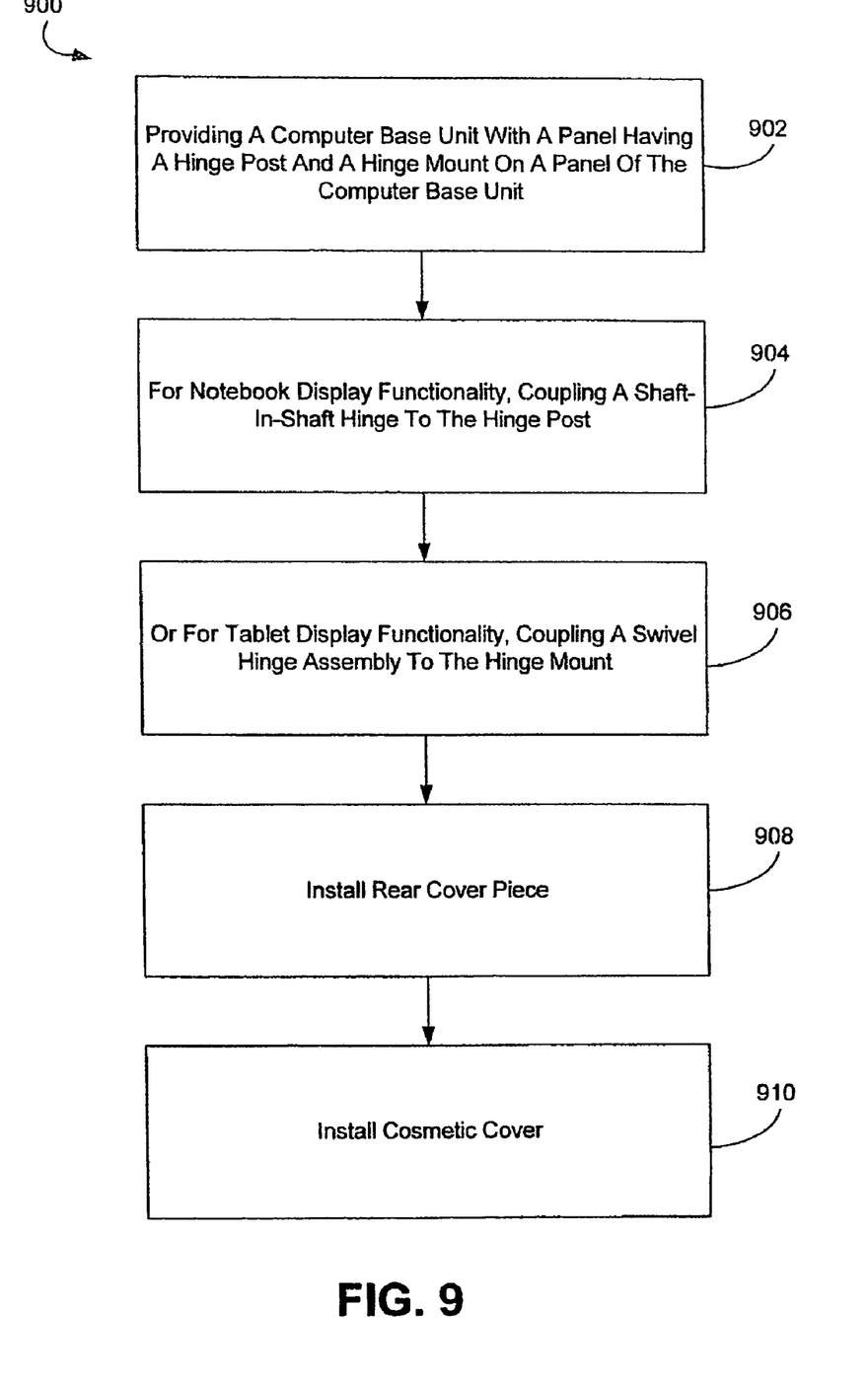
FIG. 9 is a flow diagram that illustrates an embodiment of a method for configuring to order a computer.

FIG. 9 is a flow diagram that illustrates an embodiment of a method 900 for configuring to order a computer. Such a method 900 comprises providing a computer base unit with a panel having a hinge post and a hinge mount (902). Then, for notebook display functionality, coupling a shaft-in-shaft hinge to the hinge post (904), or for tablet display functionality, coupling a swivel hinge assembly to the hinge mount (906). Optionally, a rear cover piece may be installed (908) and/or a cosmetic cover may be installed (910).

An embodiment of a method for coupling a computer base unit with different display assemblies may comprise, for notebook display functionality, coupling a hinge post located on a panel of the computer base unit to a shaft-in-shaft hinge and coupling the shaft-in-shaft hinge to a first display assembly configured to rotate with respect to a horizontal axis, and for tablet display functionality, coupling a hinge mount located on the panel of the computer base unit to a swivel hinge assembly and coupling the swivel hinge assembly to a second display assembly configured to rotate with respect to a vertical axis and a horizontal axis.

Any process descriptions or blocks in flow diagrams should be understood as representing a process, and alternate implementations are comprised within the scope of the disclosure in which functions may be executed out of order from that shown or discussed, including substantially concurrently or in reverse order, depending on the functionality involved, as would be understood by those reasonably skilled in the art.

What is claimed:

1. A method of manufacturing a computer, comprising:
   forming a first hinge post, a second hinge post, and hinge mounts on a panel of a computer base unit, the computer base unit configured for both clam-shell type and center-swivel type operations:
   when configured for the clam-shell type operation,
      coupling a first display assembly to a first shaft-in-shaft hinge and a second shaft-in-shaft hinge; and
      coupling the first shaft-in-shaft hinge and the second shaft-in-shaft hinge to the first hinge post and the second hinge post, respectively; and when configured for the center-swivel type operation,
      coupling a second display assembly to a third shaft-in-shaft hinge and a fourth shaft-in-shaft hinge of the swivel hinge assembly, the third and fourth shaft-in-shaft hinges different than the first and second shaft-in-shaft hinges; and
      coupling the swivel hinge assembly to the hinge mounts.

2. The method of claim 1, further comprising mounting a rear cover piece to the back of the computer base unit.

3. The method of claim 1, further comprising mounting a cover to the computer base unit to cover an area exposed between either the first or second display assembly and a surface of the base unit.

4. The method of claim 1, further comprising mounting a cover to the computer base unit and mounting a support bracket to the panel.

5. A method for coupling a computer base unit with different display assemblies, comprising:
   providing a computer base unit having first and second hinge posts and hinge mounts on a panel of the computer base unit, the first and second hinge posts located in close proximity to separate corners of the computer base unit and separate from the hinge mounts; and
   when configured for notebook display functionality, coupling a first shaft-in-shaft hinge to the first hinge post and a second shaft-in-shaft hinge to the second hinge post; and
   when configured for tablet display functionality, coupling a swivel hinge assembly to the hinge mounts.

6. The method of claim 5, further comprising coupling a notebook display assembly to the first and second shaft-in-shaft hinges to enable rotation of the notebook display assembly with respect to an axis parallel to a plane of the computer base unit.

7. The method of claim 5, further comprising coupling a tablet personal computer display assembly to the swivel hinge assembly to enable rotation with respect to an axis parallel and an axis perpendicular to a plane of the computer base unit.

8. The method of claim 5, further comprising mounting a rear cover piece to the back of the computer base unit.

9. The method of claim 5, further comprising mounting a cover to the computer base unit to cover an area exposed between either of the display assemblies and a surface of the base unit.

10. The method of claim 5, further comprising mounting a cover to the computer base unit and mounting a support bracket to the panel.

11. A computer comprising:
    a computer base unit comprising a panel, the panel comprising a first hinge post, a second hinge post, and hinge mounts, the computer base unit configured for both clam-shell type and center-swivel type operations;
    when configured for the clam-shell type operation, the computer further comprising:
    a first display assembly coupled to a first shaft-in-shaft hinge and a second shaft-in-shaft hinge, the first shaft-in-shaft hinge and the second shaft-in-shaft hinge coupled to the first hinge post and the second hinge post, respectively; and
    when configured for the center-swivel type operation, the computer further comprising:
    a second display assembly coupled to a third shaft-in-shaft hinge and a fourth shaft-in-shaft hinge of a swivel hinge assembly, the third and fourth shaft-in-shaft hinges distinct and separate from the first and second shaft-in-shaft hinges, the swivel hinge assembly coupled to the hinge mounts.

12. The computer of claim 11, further comprising:
    a cover coupled to the computer base unit; and
    a support bracket mounted to the panel.

13. The computer of claim 11, wherein the swivel hinge assembly comprises a swivel hinge configured to provide rotation of the second display assembly with respect to an axis perpendicular to the plane of the computer base unit.

14. The computer of claim 11, wherein the first and second shaft-in-shaft hinges are configured to provide rotation of a coupled display assembly with respect to an axis parallel to a plane of the computer base unit.

15. The computer of claim 11, further comprising a cover coupled to the computer base unit and configured to cover areas adjacent to the swivel hinge assembly.

16. A computer, comprising:

a base unit comprising a panel;

means for coupling a clam-shell style display assembly to the panel; and means for coupling a tablet-style display assembly different than the clam-shell style display assembly to the panel, the means for coupling the clam-shell style display assembly located in a different location of the base unit than the means for coupling the tablet-style display assembly.

* * * * *

UNITED STATES PATENT AND TRADEMARK OFFICE
CERTIFICATE OF CORRECTION

PATENT NO.        : 7,463,481 B2                                     Page 1 of 1
APPLICATION NO. : 11/364256
DATED             : December 9, 2008
INVENTOR(S)       : Jeffrey A. Lev et al.

It is certified that error appears in the above-identified patent and that said Letters Patent is hereby corrected as shown below:

In column 5, line 48, in Claim 1, delete "operations:" and insert -- operations; --, therefor.

In column 6, line 36, in Claim 11, delete "computer" and insert -- computer, --, therefor.

Signed and Sealed this

Seventh Day of July, 2009

JOHN DOLL
*Acting Director of the United States Patent and Trademark Office*